(12) United States Patent
Jiao et al.

(10) Patent No.: US 11,245,512 B2
(45) Date of Patent: Feb. 8, 2022

(54) COMMUNICATION HARDWARE VIRTUALIZATION

(71) Applicants: UNIVERSITEIT GENT, Ghent (BE); IMEC VZW, Leuven (BE)

(72) Inventors: Xianjun Jiao, Ghent (BE); Wei Liu, Merelbeke (BE); Felipe Augusto Pereira De Figueiredo, Ghent (BE); Ingrid Moerman, Nazareth (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 16/648,306

(22) PCT Filed: Sep. 18, 2018

(86) PCT No.: PCT/EP2018/075254
§ 371 (c)(1),
(2) Date: Mar. 18, 2020

(87) PCT Pub. No.: WO2019/057731
PCT Pub. Date: Mar. 28, 2019

(65) Prior Publication Data
US 2020/0287698 A1    Sep. 10, 2020

(30) Foreign Application Priority Data
Sep. 19, 2017  (EP) ..................................... 17191983

(51) Int. Cl.
*H04W 88/16*        (2009.01)
*H04W 72/04*        (2009.01)
(Continued)

(52) U.S. Cl.
CPC .............. *H04L 5/10* (2013.01); *H04L 1/1838* (2013.01); *H04L 5/12* (2013.01); *H04L 27/233* (2013.01);
(Continued)

(58) Field of Classification Search
CPC . H04L 5/10; H04L 1/1838; H04L 5/12; H04L 27/233; H04L 27/364;
(Continued)

(56) References Cited

U.S. PATENT DOCUMENTS

2003/0147479 A1    8/2003   Shah et al.
2004/0242261 A1   12/2004   Fette
(Continued)

OTHER PUBLICATIONS

Roberto de Matos, Tiago Rogério Mück, Antoñio Augusto Fröhlich and Leandro Buss Becker, Evaluation of PHY Reconfiguration Latency in SDR Gateway for WSN, In: Proceedings of the International Information and Telecommunication Technologies Symposium, pp. 199-202, Florianópolis, Brazil, Dec. 2009. (Year: 2009).*

(Continued)

*Primary Examiner* — Moo Jeong
(74) *Attorney, Agent, or Firm* — Workman Nydegger (57) ABSTRACT

A communication system comprising: input buffers adapted for buffering incoming data streams of samples from one or more channels; a receiver adapted for sequentially processing data from the input buffers; a processing rate of the receiver is higher than or equal to an incoming data rate of the incoming data; context memory adapted for saving an internal status of the receiver after processing the data corresponding with an input buffer before switching to a next input buffer and for restoring the internal status, wherein the receiver is adapted for processing the incoming data in a frame detection phase, and in a frame demodulation phase in which frames and/or subframes are demodulated into bits and wherein the internal status of the receiver related to an input buffer is only saved and restored in the frame detection phase or before and after demodulating subframes.

12 Claims, 3 Drawing Sheets

(51) Int. Cl.
*H04L 5/12* (2006.01)
*H04L 5/10* (2006.01)
*H04L 1/18* (2006.01)
*H04L 27/36* (2006.01)
*H04L 27/233* (2006.01)
*H04B 1/403* (2015.01)
*H04B 1/06* (2006.01)
*H04B 1/00* (2006.01)

(52) U.S. Cl.
CPC ....... *H04L 27/364* (2013.01); *H04W 72/0446* (2013.01); *H04W 88/16* (2013.01)

(58) Field of Classification Search
CPC .. H04W 72/0446; H04W 88/16; H04B 1/006; H04B 1/0003; H04B 1/0007; H04B 1/06; H04B 1/406
See application file for complete search history.

(56) References Cited

U.S. PATENT DOCUMENTS

| | | |
|---|---|---|
| 2005/0020299 A1 | 1/2005 | Malone et al. |
| 2007/0067610 A1 | 3/2007 | Kra et al. |
| 2007/0073997 A1 | 3/2007 | Fette et al. |
| 2008/0080451 A1* | 4/2008 | Rofougaran ......... H04B 1/0064 370/342 |
| 2011/0117871 A1 | 5/2011 | Hu et al. |
| 2016/0192381 A1 | 6/2016 | Gao et al. |

OTHER PUBLICATIONS

Liu et al., "D2.2: Technical Requirements of the ORCA Test Facility," Orchestration and Reconfiguration Control Architecture, Revision v.1.0, Jul. 4, 2017.

R J.V. Schiedon, "Multi-Channel Wireless LAN on a Shared Multi-Processor System-on-Chip," Eindhoven University of Technology, Mar. 2008.

European Search Report from EP Application No. 17191983, dated Mar. 6, 2018.

International Search Report and Written Opinion from PCT Application No. PCT/EP2018/075254, dated Nov. 22, 2018.

\* cited by examiner

COMMUNICATION HARDWARE VIRTUALIZATION

FIELD OF THE INVENTION

The present invention relates to the field of multiple virtual parallel receivers. More specifically it relates to a plurality of virtualized receivers which can process incoming data from multiple channels and/or standards concurrently without losing data.

BACKGROUND OF THE INVENTION

In prior art systems multiple virtual parallel receivers may be built on top of an existing Wi-Fi MAC layer, wherein multiple virtualized access points have to transmit and receive signals on the same Wi-Fi channel. That means multiple virtualized access points share the physical AP's native data rate.

Other prior art solutions (e.g. US20160192381, US20050020299) disclose band-interleaving or TDM (Time Division Multiplexing) to support multiple channels via the same hardware. In these band-interleaving/TDM schemes, at the same moment there is only one active band/channel.

An easy and direct solution of concurrent multi-bands or multi-channels is using multiple chips (i.e. a chip set for each band/channel). This side by side approach, however, results in a bill of material which is almost the sum of the bill of materials of the separate bands/channels.

In case of multiple channel use cases, e.g. a Wi-Fi router in which it is possible to select the channel it will work in, once a channel is selected the router will only work in the selected channel. Such a prior art router will not receive multiple channels concurrently. Prior art solutions wherein concurrent processing of a plurality of channels is supported are comprising multiple chips wherein each chip corresponds with a different channel.

Nowadays concurrent processing of different telecommunication standards is achieved by different processing units. Typically also chips work only for a single channel at one moment but can't demodulate multiple channels' data simultaneously.

US2007/067610 A1 is in the domain of fiber communication. It focuses on how to process an incoming bitstream in which a plurality of channels is multiplexed. In US2007/067610 A1 a channel refers to a logical channel in an incoming bitstream of data. The logical channels are multiplexed in a single bitstream and need to be extracted therefrom.

US2011/117871 A1 relates to a technique for processing radio packages. The processing of the radio packages is divided into subtasks and results of the radio package processing are stored on a pre-subtask basis. By context switching at the subtask level instead of at the task level the processing of the radio packages can be scheduled in a more efficient manner and context switches can be scheduled in a more efficient manner without losing processing results that have already being generated. In US2011/117871 A1 the scheduler is triggered randomly by interrupts. Storing and resuming therefore needs to be done for each sub-task as it is not known when the interrupt will come.

There is therefore a need for communication systems wherein the same hardware is shared for receiving data from a plurality of channels and/or from a plurality of standards.

SUMMARY OF THE INVENTION

It is an object of embodiments of the present invention to provide a good communication system for simultaneously receiving incoming data streams of samples from one or more channels.

The above objective is accomplished by a method and device according to the present invention.

In a first aspect embodiments of the present invention relate to a communication system for receiving incoming data. The communication system thereby receives incoming data streams of samples from one or more channels. As will be described later in the description the incoming data streams of samples may be coming from different standards within the one or more channels. Throughout the description this is also referred to as data from a plurality of channel and/or a plurality of standard. The communication system comprises: a plurality of input buffers adapted for buffering the incoming data streams from the plurality of channels and/or standards; a receiver adapted for sequentially processing data from the different input buffers wherein a processing rate of the receiver is higher than or equal to an incoming data rate of the incoming data; the receiver is adapted for processing the incoming data in a frame detection phase in which a start point of frames and/or subframes in the incoming data is detected, and in a frame demodulation phase in which the frames and/or subframes are demodulated into bits. The communication system moreover comprises context memory adapted for saving an internal status of the receiver after processing the data corresponding with an input buffer (e.g. corresponding with a channel and/or standard) before switching to a next input buffer (a next channel and/or standard) and for restoring the internal status of the receiver with a saved internal status related to the next input buffer (the next channel and/or standard) before switching to the next input buffer (the next channel and/or standard). The internal status of the receiver related to a channel and/or standard is only saved and restored in the frame detection phase or before and after demodulating subframes.

It is an advantage of embodiments of the present invention that the same receiver can be shared for incoming data streams of samples (multiple channels and/or standards). It is moreover advantageous that such a communication system, in accordance with embodiments of the present invention, can concurrently process incoming data from multiple channels and/or standards without losing data.

This is achieved by buffering the incoming data streams from the different channels and/or standards before processing it with the receiver and by using context memory for switching between input buffers. The status of hardware memory components such as RAM, registers may be stored to the context memory. Thereby the state with regard to the processing of data from a channel and/or standard stored in an input buffer is saved for the next iteration of that channel and/or standard.

It is an advantage of embodiments of the present invention that the throughput will be N times the throughput of the band-interleaving/TDM scheme, if there are N channels served. The reason therefore being that in embodiments of the present invention N channels can operate full-time in parallel, while in the band-interleaving/TDM scheme only one channel can be activated at one moment.

The channels may for example be realized through different frequency bands, they may be obtained through different antenna's or through one broadband antenna. Alternatively the channels may be received via different wires. The invention is, however, not limited thereto.

In embodiments of the present the input buffers are adapted for buffering data from different channels. Buffering may comprise converting the data from analog to digital. The length of the input buffers may be different and also the sampling rate may be different depending on the requirements. Both the length and the sampling rate may be configurable.

It is an advantage of embodiments of the present invention that they only need one radio-hardware/PHY instance instead of multiple physical instances as in Full-Spectrum-Capture or multi-chips/basebands schemes. This results in a reduced silicon size and cost.

In embodiments of the present invention the receiver is adapted for processing the incoming data in at least two phases. A first phase in which a start point of frames and/or subframes in the incoming data is detected, followed by a second phase in which the frames and/or subframes are demodulated, wherein the internal status of the receiver related to a channel and/or standard is only saved and restored in the first phase or before and after demodulating subframes.

Communication systems according to embodiments of the present invention are adapted for receiving incoming data streams which are subdivided in frames and/or subframes. It is an advantage of embodiments of the present invention that context saving and restoring is only applied in the first phase or before and after demodulating subframes. Thus the number of parameters to be saved and restored can be significantly reduced. This is possible because after the frame detection phase the start of a frame, and in embodiments of the present invention also the end of a frame, is known and therefore the frames can be processed as a whole in the frame demodulation phase. Therefore in the frame demodulation phase no context saving and/or restoring is required between the demodulation of frames. In embodiments of the present invention wherein subframes are demodulated, the subframes can be processed as a whole in the frame demodulation phase. In these embodiments context saving and restoring may be done between subframes. Demodulation of subframes as whole results in less parameters to be saved and restored for the context switching than when the demodulation is interrupted at any time because of switching between channels. As the numbers of parameters to be saved and restored can be significantly reduced, the number of μs required to do the context saving or restoring can also be significantly reduced.

The reduction of the number of parameters to be saved and restored is particularly advantageous when the communication system is implemented at hardware level (e.g. in an FPGA or ASIC). In particular in an FPGA the hardware constraints are severe and the reduction of the number of parameters for the context switching is beneficial.

The frame detection phase is dependent on the communication standard used.

In embodiments of the present invention the input buffers, the receiver and the context memory are implemented at hardware level.

In embodiments of the present invention the communication system may for example be implemented in an FPGA or ASIC.

It is an advantage of embodiments of the present invention that latency critical components are implemented at hardware level. This is for example particularly advantageous in Wi-Fi for which 1 OFDM symbol has a duration of only about 4 μs.

It is an advantage of embodiments of the present invention that the flexibility of being able to receive incoming data streams of samples from a plurality of channels and/or standards using a shared receiver without losing incoming data is implemented at the physical layer. Thus a communication system with increased flexibility and with low latency is obtained.

In embodiments of the present invention the communication system comprises a block buffer per incoming buffer wherein the communication system is adapted for triggering transfer of the incoming data from the input buffer to the block buffer when the start point of the frame or subframe is detected and for transferring complete frames or subframes in the block buffer.

In embodiments of the present invention the receiver is therefore adapted for detecting the start of the frames or subframes and the end of the frames or subframes.

In embodiments of the present invention complete frames are stored in the blockbuffer. It is thereby an advantage that no context saving and restoring is required for processing the data from the block buffer. In these buffers the start and end-point of a frame is known. Hence it is possible to process the data in the block buffer as a whole. Hence no context saving and restoring is required.

In embodiments of the present invention complete subframes are stored in the blockbuffer. Also this is advantageous because it leads to a reduced number of parameters which need to be saved and restored for context switching compared to a system wherein the demodulation is interrupted at any time because of switching between channels.

In embodiments of the present invention the input buffers, the receiver, the context memory and the block buffers are implemented at hardware level.

In embodiments of the present invention the incoming data is subdivided in sets which correspond with different standards.

It is an advantage of embodiments of the present invention that different standards (e.g. Wi-Fi, LTE, BLE, ZigBee) are supported by a single communication system. This communication system may even be implemented on a single chip. In prior art communication systems the focus is on a single technology at one moment in time, i.e. a chip could support multi-standards, so it could serve one channel for multi-standards, but at the same moment, the multi-mode chip only works in one standard.

In embodiments of the present invention the communication system comprises a channelizer adapted for receiving a plurality of channels from a broadband front end and connected with the input buffers for filling the input buffers with incoming data from the plurality of channels.

Communication systems according to embodiments of the present invention may be implemented in a single integrated chip.

In a second aspect embodiments of the present invention relate to a network system, the network system comprising at least one transmitter or a plurality of transmitters adapted for transmitting data over a plurality of channels, and at least one communication system in accordance with embodiments of the present invention for receiving the data from the different channels.

It is an advantage of embodiments of the present invention that a full end to end protocol stack operating over different channels can be implemented. The communication system may for example be designed for a new radio type. This may for example be done in a FPGA or in an ASIC.

In a third aspect embodiments of the present invention relate to a method for processing of incoming communication data. The method thereby receives incoming data streams of samples from one or more channels. The incoming data streams of samples may be coming from different standards within the one or more channels. This is also referred to as data coming from a plurality of channel and/or a plurality of standards. The method comprises: buffering the incoming data streams coming from the plurality of channels and/or standards; sequentially processing the data from the plurality of channels and/or standards at a processing rate which is higher than or equal to an incoming data rate of the incoming data and processing the data in a frame detection phase in which a start point of frames and/or subframes in the incoming data is detected, and in a frame demodulation phase in which the frames and/or subframes are demodulated into bits; saving an internal status related to the processing of data of an incoming data stream (of a channel and/or standard) before processing the data of a next incoming datastream (a next channel) and restoring an internal status related the processing of the next incoming datastream (the next channel) before switching to the next incoming datastream (the next channel) wherein the internal status of the receiver related to an incoming datastream (a channel and/or standard) is only saved and restored in the frame detection phase or before and after demodulating subframes.

In embodiments of the present invention processing the incoming data comprises a first phase in which a start point of frames and/or subframes of the incoming data is detected, followed by a second phase in which the frames and/or subframes are demodulated, wherein the internal status related to the processing of data of a channel and/or standard is only saved and restored in the first phase or before and after demodulating subframes.

In a fourth aspect embodiments of the present invention relate to a gateway for receiving data from a first network and transmitting the data to a second network. The gateway comprises a communication system in accordance with embodiments of the present invention. The gateway is adapted for receiving the data from the first network using the communication system and for transmitting the received data to the second network.

It is an advantage of embodiments of the present invention that a low cost, high performance gateway can be achieved. Meanwhile, it will also be very flexible to construct multiple virtualized (but still full time and full performance) wireless networks according to multiple different service/user/application requirements.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a communication system 100 for receiving incoming data. The communication system thereby receives incoming data streams of samples from one or more channels. As will be described later in the description the incoming data streams of samples may be coming from different standards within the one or more channels. Throughout the description this is also referred to as data from a plurality of channels 110 and/or standards. Communication systems 100 according to embodiments of the present invention are comprising a plurality of input buffers 120 adapted for buffering the incoming data streams from the plurality of channels 110 and/or standards, a receiver 130 adapted for sequentially processing data from the different input buffers 120 wherein a processing rate of the receiver 130 is higher than or equal to an incoming data rate of the incoming data. The receiver 130 is adapted for processing the incoming data in a frame detection phase in which a start point of frames and/or subframes in the incoming data is detected, and in a frame demodulation phase in which the frames and/or subframes are demodulated into bits. The communication system 100 moreover comprises context memory 140 adapted for saving an internal status of the receiver after processing the data of one input buffer (coming from one channel and/or standard) before switching to a next input buffer (channel and/or standard) and for restoring the internal status of the receiver with a saved internal status related to next input buffer (the next channel and/or standard) before switching to the next input buffer (the next channel and/or standard) wherein the internal status of the receiver related to a channel and/or standard is only saved and restored in the frame detection phase or before and after demodulating subframes. In embodiments of the present invention the processing rate of the receiver is at least X times (X is the number of buffers) the rate at which the data enters the buffers to avoid data loss caused by buffer overflow. In embodiments of the present invention the communication system is adapted for buffering the incoming data from the plurality of channels 110 and/or standards in parallel in the plurality of input buffers 120.

Thus a communication system can be achieved comprising one receiver acting like multiple logical receivers that can be used for multiple simultaneous channels/standards as if there is a dedicated full-time receiver for each channels/standards. The communication system may support multiple antennas/users.

Figure 1:
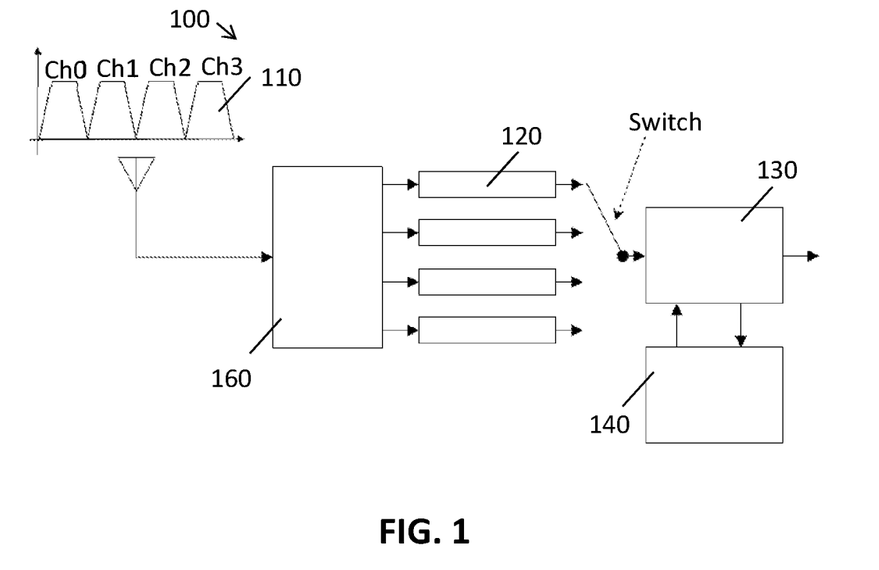
FIG. 1 shows a schematic drawing of a communication system for receiving incoming data from a plurality of channels, comprising a channelizer, in accordance with embodiments of the present invention.
Figure 2:
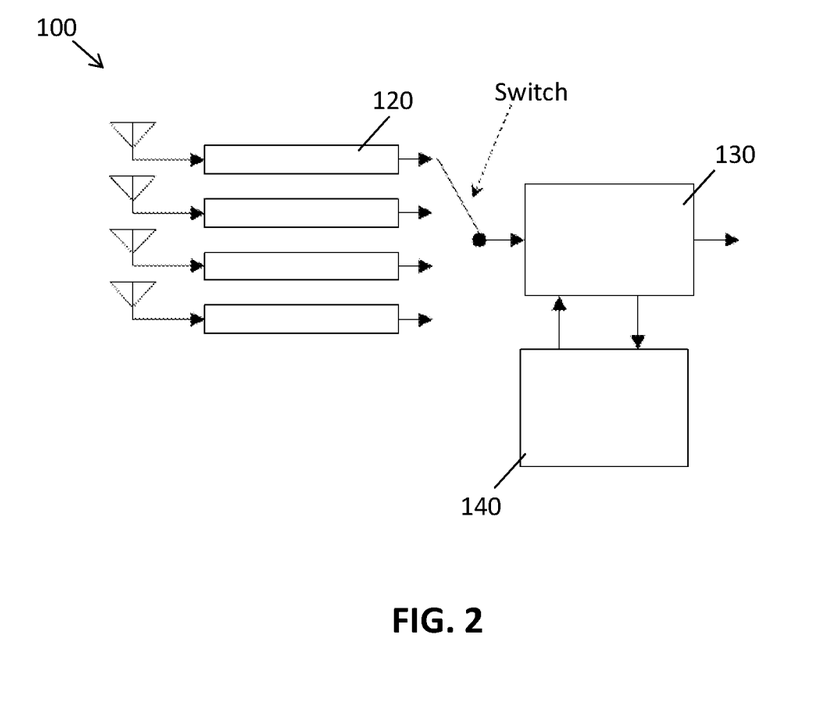
FIG. 2 shows a schematic drawing of a communication system for receiving incoming data from a plurality of channels, wherein the data is coming from a plurality of antennas, in accordance with embodiments of the present invention.
Figure 3:
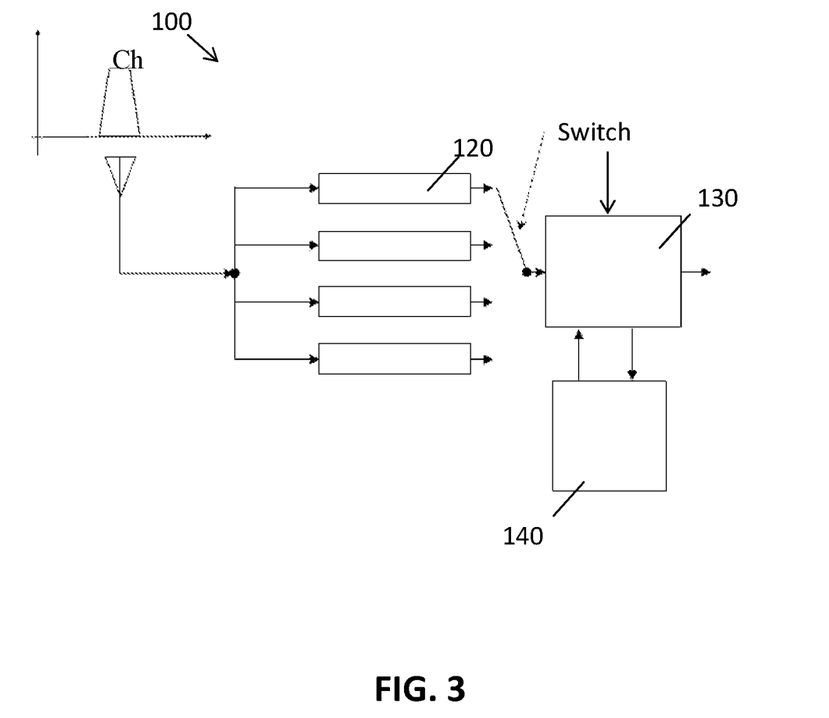
FIG. 3 shows a schematic drawing of a communication system with incoming data related to a plurality of standards in accordance with embodiments of the present invention.

In embodiments of the present invention a channel thereby relates to a physical carrier. It could for example be an RF signal at a specific frequency (FIG. 1), an RF signal received by a specific antenna (FIG. 2). Multiple standards may run in the same channel (FIG. 3).

The communication system 100 may be an electrical, an optical or a radio communication system. It may comprise a broadband front end for receiving data from the different channels. This is for example illustrated in FIG. 1 wherein via the antenna 112 a broadband RF signal can be received. The hardware can receive the 4 channels at the same time. In the exemplary embodiment illustrated in FIG. 1 a channelizer 160 can read 4 streams. The invention is, however, not limited thereto and more or less streams are possible. In the example the 4 channels are each corresponding with a different frequency. The channelizer adapted for splitting the incoming data stream into a data stream per channel. In this example this is achieved at spectral level by filtering the broadband signal coming from the broadband antenna.

After the channelizer 160, the input buffers 120 are present. Each input buffer is adapted for buffering a predetermined amount of data. The input buffers may for example be adapted for buffering between 10 and 100 μs of an incoming signal comprising the incoming data, for example between 20 and 60 μs of the incoming signal, for example for buffering 40 μs of the incoming signal. In embodiments of the present invention the length of the input buffers may be tunable. The input data in the different input buffers may correspond with a different standard.

In the buffering stage the conversion from the incoming analog signal to a digital signal may be done if the channelizer is an analog channelizer. If the channelizer is digital channelizer, analog to digital conversion will be done before it. The sampling rate may be different dependent on the requirements. The sampling rate may be configurable.

The receiver on the other hand needs a smaller amount of time than the time it takes to fill an input buffer. Therefore the receiver can process different input buffers without losing any incoming data.

In another exemplary embodiment of the present invention, illustrated in FIG. 2, the front end may comprise an antenna 113 per channel 100. In that case no channelizer is required. The antenna's may for example be located in different rooms, all antenna's being connected to the communication system 100.

With a single receiver 130 concurrent reception of parallel input channels/standards can be done. From the user point of view such a system can be regarded as if it has different receivers per channel/standard. This as opposed to prior art system which switch between channels/standards but which don't allow concurrent processing of the data from the different channels/standards. Prior art systems for example switch to a certain channel and at that moment they only use that specific channel. At that moment data from the other channels is lost.

In the exemplary embodiments illustrated in FIG. 1 and FIG. 2, one hardware receiver 130 can be shared by multiple channels/antennas/etc. as if there is a dedicated receiver working for each channel working in full-time. This dedicated logical receiver can be achieved, because there is an input buffer 120 for each input. Signal-samples (e.g. IQ) of one input won't be lost when the receiver 130 is serving input buffers of other inputs. Signal/IQ-samples of one input will be processed immediately after the receiver switches back after a full round. By high performance hardware processing, all samples in the input buffers 120 can be processed in a short time, for example 10 μs, which is much shorter than the buffering time—e.g. 40 μs. In this hardware/receiver sharing scheme, the receiver 130 also has to save and restore all the necessary context information for each input buffer 120 respectively, because the input buffer 120 may contain incomplete slot/frame/OFDM-symbol/etc., and the receiver 130 also has memory and many internal intermediate states. These internal states and context information is stored in the context memory 140.

In communication systems according to embodiments of the present invention a single physical layer instance may be shared by multiple channels. This implies that the aggregated data rate will be N (assume N channels share a single physical layer) times of the data rate of a single channel. The channel may for example be a Wi-Fi channel built upon a single physical layer. The proposed approach creates multiple logical physical layers, not by putting multiple physical layer instances in the chip, but by scheduling blocks in a single physical layer chain fastly among multiple channels.

In embodiments of the present invention the incoming data is subdivided in sets which correspond with different standards which can be received and processed simultaneously. It may for example possible to receive and process Wi-Fi and ZigBee simultaneously. It may for example also be possible to process a plurality of Wi-Fi channels and a plurality of ZigBee channels simultaneously. The different standards may run in the same channel or in different channels. It is an advantage of embodiments of the present invention that they allow multi-mode operation for multi-standards in the same channel (or multi-channel) without losing any data. For multi-standards support, the communication system may be adapted for performing a standard switch control. FIG. 3 shows an exemplary embodiment of the present invention which is receiving data from one channel and wherein the incoming data is subdivided in sets which correspond with a plurality of standards. In the example each of the input buffers 120 is buffering incoming data corresponding with a different standard. The receiver is adapted for receiving data corresponding with the different standards at a rate which is higher than the sum of the rates at which the input buffers are filled. Every time when switching to another input buffer, the receiver thereby switches to the standard corresponding the standard of the data in that input buffer.

In an exemplary embodiment of the present invention a GPS and LoRa system can run in a low SNR. In embodiments of the present invention different users/sources' signals can be detected/demodulated even if they overlap in the same frequency/time and antenna. In embodiments of the present invention the same standard may run in the same channel. For example, all GPS satellites may send a signal in one channel (same time, frequency at same antenna of receiver). The receiver may still be able to track and demodulate each satellite signal respectively.

Communication systems according to embodiments of the present invention are comprising context memory adapted for saving an internal status of the receiver when switching from one input buffer to another input buffer. This internal status is related to the current incoming data which is being processed. It may comprise the status of hardware memory components such as RAM, registers. Before starting to process the next input buffer the receiver status when previously processing that input buffer has to be restored.

In communication systems the data is typically transmitted over one or more physical channels (e.g. radio channels, electrical channels, optical channels) which cause distortion of the data.

In these communication systems the transmitter may send a header comprising pre-known data (e.g. preamble or pilot) which allows the receiver to estimate the channel (e.g. what kind of distortion is caused by the channel). Besides the channel estimation, the receiver also uses this header data to find out the start of the distorted signal. The header data is followed by the actual user data and the receiver tries to recover the user data by inversing the channel distortion according to the estimated channel. Thus a frame is formed comprising header data and actual user data.

Figure 4:
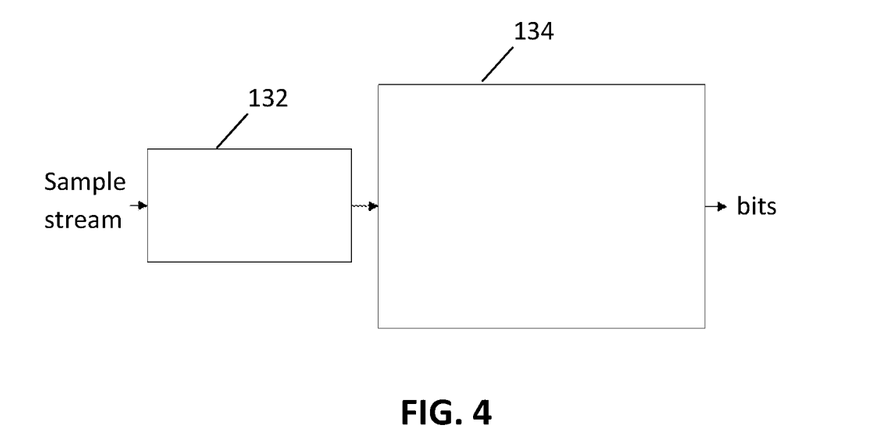
FIG. 4 shows a receiver chain comprising a frame detection unit and a frame demodulation unit, in accordance with embodiments of the present invention.

Typically a receiver chain is composed of two parts: 1) a frame detection unit and 2) a frame demodulation unit. The main purpose of frame detection is to find out the start time of incoming signal (e.g. represented by IQ samples) and divide the continuous samples into blocks of samples based on certain known structures (e.g., short preamble in Wi-Fi, Cyclic Prefix or CP in LTE) and/or pilot (e.g. long training sequence in Wi-Fi, Primary Synchronisation Signal or PSS in LTE). Then, the frame demodulation unit works on the detected signal blocks to demodulate information bits in a block-by-block basis by doing: frequency offset estimation and compensation; timing offset estimation and compensation; channel estimation and equalization; deinterleaving; channel decoding; descrambling; demultiplexing; CRC check; etc. An example of such a stream is illustrated in FIG. 4. The figure shows a frame detection unit 132 followed by a frame demodulation unit 134. The frame detection unit is adapted for detecting frames in an incoming stream of samples (e.g. IQ sample) based on a known structure or signal. The frame detection unit operates in streaming mode. The frame demodulation unit operates in block based mode and may perform functions such as Frequency offset estimation and compensation, timing offset estimation and compensation; channel estimation and equalization, deinterleaving, channel decoding, descrambling, demultiplexing, CRC check, etc.

The frame detection unit and the frame demodulation unit may be implemented in a dual core architecture. One core for searching on multiple incoming data streams of samples. The other core for frame/subframe-based processing on all frames/subframes collected from multiple channels by the streaming part. This allows concurrent multi-channel searching (buffers, processing, time requirement, etc).

The starting point of a frame or subframe in the incoming data stream is not known before the frame detection, therefore, the operation mode of the frame detection unit can only be streaming mode, i.e., frame detection keeps searching for the start of the frame or subframe in the samples (e.g. IQ samples) of the incoming data stream. In embodiments of the present invention the frame demodulation works in a block-by-block basis instead of streaming mode, once it works on stored/buffered blocks after frame detection/synchronization.

Considering the different functional blocks of the receiver, saving and restoring context needs extra memory, execution time and extra complexity. In principle, all functional blocks, which include delay, memory, pipeline and internal states need to do context saving and restoring. For example, FIR filtering, moving-summation, FFT, DDS (Direct Digital Synthesize), numerically controlled oscillators, deinterleaving, descrambling, decoding, CRC, etc. Actually, almost all functional blocks of a receiver need context saving and restoring if their execution can be interrupted at any phase.

A direct context saving and restoring scheme, in accordance with embodiments of the present invention, is illustrated in FIG. 1. For each switching, context memory is used to save/store all internal states of the receiver to make sure the receiver 130 resume execution for the next input buffer 120.

In embodiments of the present invention the receiver is adapted for processing the data in two phases. The first phase is the frame detection phase which may be implemented in the frame detection unit 132 of the receiver 130. In this phase the receiver does the searching for the start point of frames or subframes in the incoming data. When the receiver knows the start point of a frame or subframe, the receiver turns into the second phase also referred to as the frame demodulation phase wherein the frames and/or subframes are demodulated. This part may be implemented in the frame demodulation unit 134 of the receiver.

The frame demodulation phase may for example comprise FFT, channel estimation, equalization, etc. If a step's result has already been consumed by a successive step, less context or even no context needs to be stored (e.g. if the FFT result has been consumed by channel estimation and equalization). The effect thereof is illustrated in table B and table C for an exemplary communication system in accordance with embodiments of the present invention. Table B shows the results for the direct scheme and table C shows the results for the improved scheme according to embodiments of the present invention.

In embodiments of the present invention scheduling of switching between input buffers may be based on a predefined time unit (according to latency requirement and context size). After each time unit, the receiver may thereby switch to another input buffer (e.g. related to another channel or standard). For streaming part, this time unit can be selected as small as possible because it won't affect context size. For the frame demodulation phase this time unit could be whole frame duration for those time non-critical application, and could also be a minimum subframe duration (such as an OFDM symbol in WiFi or LTE, a chip sequence in 802.15.4) for the good of latency and size of context. In embodiments of the present invention the time-unit of the frame demodulation may be selectable between the whole frame duration and the minimum subframe duration according to requirement of the application.

In embodiments of the present invention the context saving and restoring is done only for the frame detection phase or before and after demodulating subframes.

In embodiments of the present invention the communication system comprises block buffers for storing a frame or subframe of the incoming data.

In embodiments of the present invention each entire frame is stored in the block buffer so that the frame demodulation unit always takes the whole frame. In that case no context saving/restoring is required in the second phase.

Figure 5:
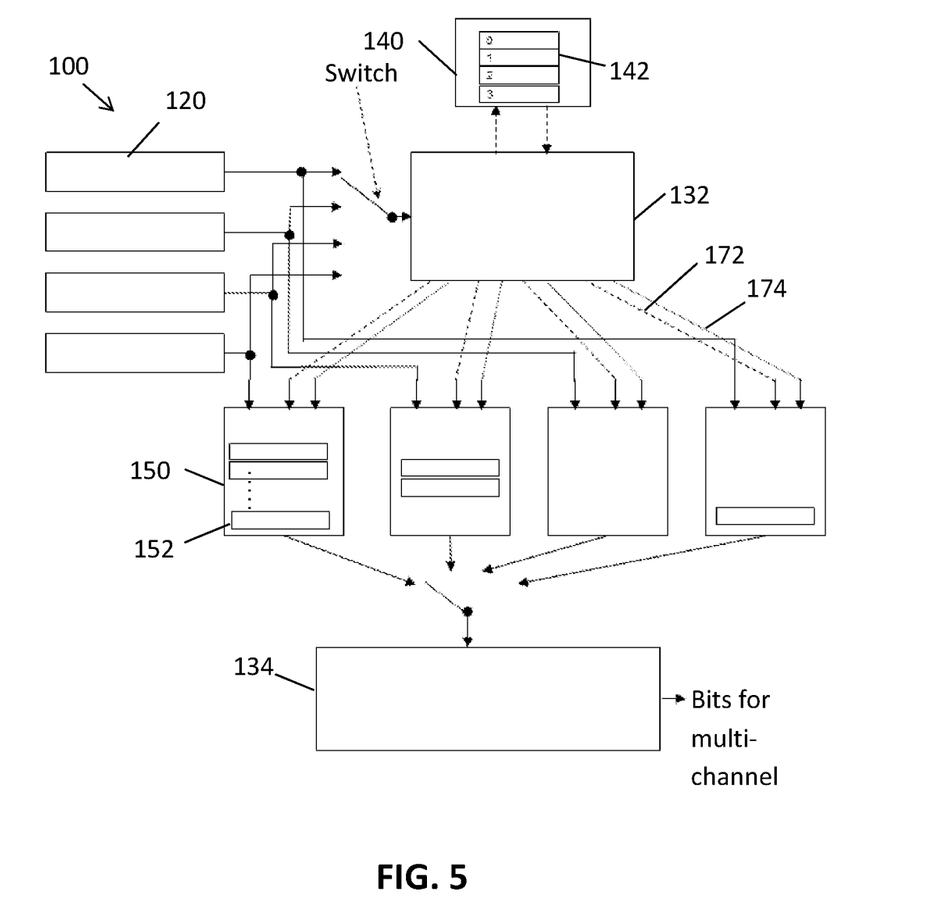
FIG. 5 shows a schematic drawing of a communication system comprising the improved scheme for context saving in accordance with embodiments of the present invention.

An example of such a communication system in accordance with embodiments of the present invention is illustrated in FIG. 5. To shrink the context memory size and time overhead of saving/restoring operation, an improved scheme is used. In this exemplary embodiment of the present invention context saving and restoring may for example only be supported for the streaming part, i.e., the frame detection unit 132. Frame detection extracts block-by-block from each sample (e.g. IQ sample) of the incoming data stream according to detection results, so that the frame demodulation 134 performs operation for each channel in a block-by-block basis without context maintenance or with limited context maintenance.

Through this method, only frame detection needs to use a context memory 140 to ensure correct operation among multiple channels. The frame detection unit 132 transports samples belonging to a frame on a given channel to the corresponding block buffer 150 in blocks.

In embodiments of the present invention subframes 152, i.e. symbols which are smaller than a frame, are stored in the block buffer 150. For example, in a WiFi system many OFDM symbols compose a frame, and the frame length is variable according to how many user data are needed to be transferred. In this case context saving/restoring is needed before and after demodulating subframes. Because the entire frame has one checksum at the end, the frame demodulation has to store the demodulation result of each OFDM symbol as context of each channel. After all OFDM symbols (belonging to one frame) are demodulated, the final checksum can be calculated to verify whether the whole frame demodulation is successful or not. In the example of Wi-Fi a block can be an OFDM symbol (duration 4 µs according to the standard) or a signal block of a full packet. Frame demodulation fetches an OFDM symbol or a full packet signal block from each channel's block buffer, and does all necessary demodulation operations to get information bits. In this way, all operations (chained together) needed for one block processing won't be interrupted, so that context maintenance overhead can be kept small during the multi-channel frame demodulation phase.

The present invention is not restricted to OFDM based operations. It can also support different other standards.

According to several widely used wireless standards, such as Wi-Fi, LTE, BLE (Bluetooth Low Energy), the most frequently used operation in streaming mode (i.e., frame detection) that has internal states/memory/registers, is FIR (Finite Impulse Response) filtering. It is due to the fact that correlation, moving-summation, which are frequently used in frame detection, can be implemented by FIR filters, that for FIR filters to maintain precise context during channel switching, context memory only needs to store the FIR coefficients and the contents of the internal shift registers.

The context memory can for example be implemented by using Block RAM in FPGAs or DDR RAM in processor systems, such as ARM system inside Xilinx Zynq SoC. FPGA internal Block RAM achieves the highest speed for saving and restoring because it is embedded in programmable logic of FPGA. Context memory can also be located in large size DDR RAM connected to the system processor to save precious FPGA internal block RAM. Considering high-speed on-chip DMA bus (order of 10 Gbps) between PS (Processor System) and PL (Programmable Logic), the time overhead of context saving and restoring still can be kept small.

In embodiments of the present invention the block buffers 150 get control signals 172, 174 from a frame detection unit 132. The frame detection unit is adapted for detecting the start point and possibly also the end point of frames and/or subframes in the incoming data. Using the control signals 172, 174 groups of incoming data from the input buffers are transferred to the block buffers. In the exemplary embodiment of FIG. 5 the control signal 172 corresponds with the block start indicator and the control signal 174 corresponds with the block end indicator. While the input buffers are streaming buffers, in the block buffers frames or subframes of data are stored.

By splitting the data in frames and subframes context memory can be saved. In case complete frames are demodulated even no context saving and restoring is required.

This is particularly advantageous in standards where fast context switching is required (e.g. in Wi-Fi 1 OFDM symbol has a duration of 4 µs and therefore Wi-Fi is challenging in terms of latency).

In embodiments of the present invention the input buffers, the receiver and the context memory are implemented at hardware level (e.g. FPGA or ASIC) and not at software level running on a PC. Especially for implementation of the receiver at hardware level it is important to freeze only after doing the full symbol processing, as this allows to reduce the required context memory.

In case subframes are demodulated, each symbol demodulation result may be stored. Even though, the size of context/result will also be significantly smaller than storing the complete internal status. The complete internal status only needs to be saved when the demodulation can be interrupted at any time because of switching between channels. As complete frames or subframes are demodulated the context that needs to be saved is limited because there are no intermediary stacks that need to be saved.

TABLE A

| Memory size & time overhead | Num of bits | Time overhead (us) | | |
|---|---|---|---|---|
| | | DDR, 9.6 Gbps bus | DDR, 48 Gbps bus | BRAM, 57.6 Gbps bus |
| Direct scheme | 430088 | 44.800 | 8.960 | 2.837 |
| Improved scheme | 90881 | 9.466 | 1.893 | 0.586 |

In table A a case study of context memory size for a communication system (in this case a Wi-Fi receiver) in accordance with embodiments of the present invention is given. The values are based on resource consumed by an actual PHY design of an IEEE802.11a compliant Wi-Fi receiver on an FPGA. The improved scheme corresponds with a communication system wherein, in a first phase a start point of the frames and/or subframes in the incoming data is detected, followed by a second phase in which the frames and/or subframes are demodulated, wherein the internal status of the receiver related to a channel is only saved and restored in the first phase or before and after demodulating subframes. The direct scheme corresponds with a communication system wherein no optimizations are done with regard to the context memory.

DDR 9.6 Gbps bus means only one high performance AXI bus is used for transferring context data between PL (FPGA) and PS (ARM) in Xilinx Zynq SoC. DDR 48 Gbps bus means all 5 high performance AXI buses are used. BRAM 57.6 Gbps bus means 4 Block RAMs (72 bits width each) ports are used to transfer context data between receiver blocks and BRAM based distributed context memory in PL of Xilinx Zynq SoC.

The implementation data in table A are based on Xilinx Zynq-7000 XC7Z045 FFG900-2 chip which is released in 2012. Detailed intra receiver block level results, are illustrated in the table B for the direct scheme and in table C for the improved scheme.

TABLE B

| | Direct context memory saving when interruption at arbitrary time instance | | | |
|---|---|---|---|---|
| Blocks inside receiver | Equivalent inbits (16-input LUT = 2^6 bit, 1 slice reg = 1 bit, 1 BRAM = 36 kb) | Transfer time in ns, estimated when storage in DDR using HP speed 9.6 Gb/s | Transfer time in ns, estimated when storage in DOR using 5 HP | Transfer time in ns, storage in BRAM, rough estimation by 4 × 72 bit transfer block, clk200 MHz |
| Short preamble search | 3229 | 336.3541667 | 67.27083333 | 56.05902778 |
| Timing sync based on LTS | 6857 | 714.2708333 | 142.8541667 | 119.0451389 |
| Freq offset estimation from LTS | 10891 | 1134.479167 | 226.8958333 | 189.0798611 |
| Channel estimation from LTS | 40938 | 4264.375 | 852.875 | 710.7291667 |
| Freq compensation module | 1466 | 152.7083333 | 30.54166667 | 25.45138889 |
| FFT | 163431 | 17024.0625 | 3404.8125 | 2837.34375 |
| Phase tracking and correlation based on paliots | 4697 | 489.2708333 | 97.85416667 | 81.54513889 |
| MMSE equalization | 19009 | 1980.104167 | 396.0208333 | 330.0173611 |
| De-map from symbol to soft bits | 629 | 65.52083333 | 13.10416667 | 10.92013889 |
| de-interleave | 108064 | 11256.66667 | 2251.333333 | 1876.111111 |
| Viterbi decoder | 33811 | 3521.979167 | 704.3958333 | 586.9965278 |
| De-scrambler | 19003 | 1979.479167 | 395.8958333 | 329.9131944 |
| CRC check | 34 | 3.541666667 | 0.708333333 | 0.590277778 |
| Information parsing: SIGNAL, service type, PSDU type | 18029 | 1878.020833 | 375.6041667 | 313.0034722 |
| total | 430088 | 44800.83333 | 8960.166667 | 2837.34375 |

TABLE C

Full context saving @ streaming part + block results saving for OFDM symbol

| Blocks inside receiver | Equivalent inbits (16-input LUT = 2^6 bit, 1 slice reg = 1 bit, 1 BRAM = 36 kb) | Transfer time in ns, estimated when storage in DDR using HP speed 9.6 Gb/s | Transfer time in ns, estimated when storage in DOR using 5 HP | Transfer time in ns, storage in BRAM, rough estimation by 4 × 72 bit transfer block, clk200 MHz |
|---|---|---|---|---|
| Short preamble search | 3229 | 336.3541667 | 67.27083333 | 56.05902778 |
| Timing sync based on LTS | 6655 | 693.2291667 | 138.6458333 | 115.5381944 |
| Freq offset estimation from LTS | 18 | 1.875 | 0.375 | 0.3125 |
| Channel estimation from LTS | 1664 | 173.3333333 | 34.66666667 | 28.88888889 |
| Freq compensation module | 34 | 3.541666667 | 0.708333333 | 0.590277778 |
| FFT | 2496 | 260 | 52 | 43.33333333 |
| Phase tracking and correlation based on paliots | 1872 | 195 | 39 | 32.S |
| MMSE equalization | 2496 | 260 | 52 | 43.33333333 |
| De-map from symbol to soft bits | 1156 | 120.4166667 | 24.08333333 | 20.06944444 |
| de-interleave | 384 | 40 | 8 | 6.666666667 |
| Viterbi decoder | 33811 | 3521.979167 | 704.3958333 | 586.9965278 |
| descrambler | 19003 | 1979.479167 | 395.8958333 | 329.9131944 |
| CRC check | 34 | 3.541666667 | 0.708333333 | 0.590277778 |
| Information parsing: SIGNAL, service type, PSDU type | 18029 | 1878.020833 | 375.6041667 | 313.0034722 |
| total | 90881 | 9466.770833 | 1893.354167 | 586.9965278 |

In embodiments of the present invention the power consumption may be reduced by dynamic power gating or clock gating technology. For example, in the improved context saving and restoring scheme, only the frame detection unit (the first phase) needs to always work in full speed. When there are no valid symbols (e.g. OFDM symbols) in the block buffer, the corresponding frame demodulation unit (the second phase) can be shut down to save power before switching to next buffer.

In a second aspect embodiments of the present invention relate to a network system. The network system comprising at least one transmitter or a plurality of transmitters adapted for transmitting data over a plurality of channels, and at least one communication system in accordance with embodiments of the present invention for receiving the data from the different channels.

In a third aspect embodiments of the present invention relate to a method for processing of incoming communication data. The method thereby receives incoming data streams of samples from one or more channels. The incoming data streams of samples may be coming from different standards within the one or more channels. This is also referred to as data coming from a plurality of channel and/or a plurality of standards. The method comprises: buffering the incoming data streams coming from the plurality of channels and/or standards; sequentially processing the data from the plurality of channels and/or standards at a processing rate which is higher than or equal to an incoming data rate of the incoming data and processing the data in a frame detection phase in which a start point of frames and/or subframes in the incoming data is detected, and in a frame demodulation phase in which the frames and/or subframes are demodulated into bits; saving an internal status related to the processing of data of an incoming data stream (of a channel and/or standard) before processing the data of a next incoming datastream (a next channel) and restoring an internal status related the processing of the next incoming datastream (the next channel) before switching to the next incoming datastream (the next channel) wherein the internal status of the receiver related to an incoming datastream (a channel and/or standard) is only saved and restored in the frame detection phase or before and after demodulating subframes.

In embodiments of the present invention processing the incoming data comprises a first phase in which a start point of frames and/or subframes of the incoming data is detected, followed by a second phase in which the frames and/or subframes are demodulated, wherein the internal status related to the processing of data of a channel and/or standard is only saved and restored in the first phase or before and after demodulating subframes.

Embodiments of the present invention may relate to a multi-bands/channels (also could be multi-standards) gateway comprising a communication system in accordance with embodiments of the present invention.

The invention claimed is:

1. A communication system for receiving incoming data streams of samples from one or more channels, the communication system comprising:
   a plurality of input buffers adapted for buffering the incoming data streams, a receiver adapted for sequentially processing data from the plurality of input buffers wherein a processing rate of the receiver is higher than or equal to an incoming data rate of the incoming data, wherein the receiver is adapted for processing the incoming data in a frame detection phase in which a start point of frames and/or subframes in the incoming data is detected, and in a frame demodulation phase in which the frames and/or subframes are demodulated into bits, and a context memory adapted for saving an internal status of the receiver after processing data from one of the plurality of input buffers before switching to a next input buffer and for restoring an internal status of the receiver with a saved internal status related to the next input buffer before switching to the next input buffer wherein an internal status of the receiver related to an input buffer is saved and restored only in the frame detection phase or only before and after demodulating subframes wherein the communication system is implemented at hardware level.

2. The communication system according to claim 1 wherein the incoming data streams of samples are coming from different standards within the one or more channels and wherein the input buffers are adapted for buffering the incoming data streams.

3. The communication system according to claim 1, the input buffers, the receiver and the context memory are implemented at hardware level.

4. The communication system according to claim 1, the communication system comprising a block buffer per incoming buffer wherein the communication system is adapted for triggering transfer of the incoming data from an input buffer to the block buffer when the start point of the frame or subframe is detected and for transferring complete frames or subframes in the block buffer.

5. The communication system according to claim 4, wherein the input buffers, the receiver, the context memory and the block buffers are implemented at hardware level.

6. The communication system according claim 1, wherein the incoming data is subdivided in sets which correspond with different standards.

7. The communication system according to claim 1, the communication system comprising a channelizer adapted for receiving a plurality of channels from a broadband front end and connected with the input buffers for filling the input buffers with incoming data from the plurality of channels.

8. The communication system according to claim 1 implemented in a single integrated chip.

9. A network system, the network system comprising at least one transmitter or a plurality of transmitters adapted for transmitting data over one or more channels, and at least one communication system in accordance with claim 1 for receiving the data streams of samples from one or more channels.

10. A gateway for receiving data from a first network and transmitting the data to a second network, the gateway comprising a communication system in accordance with claim 1 wherein the gateway is adapted for receiving the data from the first network using the communication system and for transmitting the received data to the second network.

11. A method for processing data streams of samples coming from one or more channels, the method comprising:
buffering the incoming data streams of samples,
sequentially processing the data from the incoming data streams of samples at a processing rate which is higher than or equal to an incoming data rate of the incoming data, wherein the data is processed in a frame detection phase in which a start point of frames and/or subframes in the incoming data is detected, and in a frame demodulation phase in which the frames and/or subframes are demodulated into bits, and
saving an internal status related to processing of data of a data stream of samples before processing data of a next data stream of samples and restoring an internal status related the processing of the next data stream of samples before switching to the next data stream of samples wherein the internal status of the receiver related to a data stream of samples is saved and restored only in the frame detection phase or only before and after demodulating subframes.

12. The method according to claim 11 wherein the incoming data streams of samples are coming from different standards within the one or more channels.

* * * * *